United States Patent
He et al.

(10) Patent No.: US 10,805,209 B2
(45) Date of Patent: Oct. 13, 2020

(54) VIRTUAL NETWORK PROTECTION METHOD AND APPARATUS

(71) Applicant: Huawei Technologies Co., Ltd., Shenzhen (CN)

(72) Inventors: Jia He, Shenzhen (CN); Yi Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/785,935

(22) Filed: Oct. 17, 2017

(65) Prior Publication Data

US 2018/0041423 A1 Feb. 8, 2018

Related U.S. Application Data

(63) Continuation of application No. PCT/CN2015/076916, filed on Apr. 17, 2015.

(51) Int. Cl.
*H04L 12/703* (2013.01)
*H04L 12/715* (2013.01)
(Continued)

(52) U.S. Cl.
CPC .......... *H04L 45/28* (2013.01); *H04L 41/0654* (2013.01); *H04L 45/02* (2013.01);
(Continued)

(58) Field of Classification Search
CPC ......... H04L 45/28; H04L 45/02; H04L 45/22; H04L 45/64; H04L 45/586;
(Continued)

(56) References Cited

U.S. PATENT DOCUMENTS

| 2011/0029675 A1* | 2/2011 | Yeow | G06F 11/2041 |
| | | | 709/226 |
| 2011/0280580 A1* | 11/2011 | Wexler | H04L 45/22 |
| | | | 398/79 |

(Continued)

FOREIGN PATENT DOCUMENTS

| CN | 102904794 A | 1/2013 |
| CN | 103401720 A | 11/2013 |

(Continued)

OTHER PUBLICATIONS

"SVNE: Survivable Virtual Network Embedding Algorithms for Network Virtualization", M. Rahman and R. Boutaba, IEEE (Year: 2013).*

(Continued)

*Primary Examiner* — Habte Mered
(74) *Attorney, Agent, or Firm* — Leydig, Voit & Mayer, Ltd.

(57) ABSTRACT

Embodiments of the present disclosure provide a virtual network protection method, including: receiving, by a network device (for example, a transport-controller), a virtual network topology establishment request message, where the virtual network topology establishment request message carries a virtual network resource parameter and/or a virtual network protection and recovery type; reserving a working physical resource and a protection physical resource in an idle physical resource of a physical network according to the virtual network resource parameter and/or the virtual network protection and recovery type; and mapping a virtual link on a virtual network to the working physical resource and the protection physical resource.

20 Claims, 4 Drawing Sheets

(51) Int. Cl.

| | | |
|---|---|---|
| *H04L 12/24* | (2006.01) | |
| *H04L 12/751* | (2013.01) | |
| *H04L 12/707* | (2013.01) | |
| *H04L 12/931* | (2013.01) | |
| *H04L 29/14* | (2006.01) | |
| *H04L 12/46* | (2006.01) | |
| *H04L 12/26* | (2006.01) | |
| *H04L 12/713* | (2013.01) | |

(52) U.S. Cl.
 CPC ............ *H04L 45/22* (2013.01); *H04L 45/64* (2013.01); *H04L 49/70* (2013.01); *H04L 69/40* (2013.01); *H04L 12/4641* (2013.01); *H04L 43/0817* (2013.01); *H04L 45/586* (2013.01)

(58) Field of Classification Search
 CPC ..... H04L 41/0654; H04L 49/70; H04L 69/40; H04L 12/4641; H04L 43/0817
 See application file for complete search history.

(56) References Cited

U.S. PATENT DOCUMENTS

| | | | |
|---|---|---|---|
| 2012/0014284 A1 | 1/2012 | Ranganathan et al. | |
| 2014/0092726 A1* | 4/2014 | Khan | H04L 45/64 |
| | | | 370/221 |
| 2014/0301192 A1* | 10/2014 | Lee | H04L 47/10 |
| | | | 370/230 |
| 2015/0104166 A1* | 4/2015 | Patel | H04Q 11/0066 |
| | | | 398/5 |
| 2015/0220740 A1* | 8/2015 | Patel | H04L 67/10 |
| | | | 726/26 |
| 2015/0295761 A1* | 10/2015 | Wang | H04L 41/0806 |
| | | | 709/222 |

FOREIGN PATENT DOCUMENTS

| | | |
|---|---|---|
| CN | 103595610 A | 2/2014 |
| CN | 103782556 A | 5/2014 |
| CN | 104144135 A | 11/2014 |
| EP | 3024184 A1 | 5/2016 |
| WO | 2014086978 A1 | 6/2014 |
| WO | 2015018035 A1 | 2/2015 |

OTHER PUBLICATIONS

Rahman et al., "SVNE: Survivable Virtual Network Embedding Algorithms for Network Virtualization", IEEE Transactions on Network and Service Management, vol. 10, No. 2, pp. 105-118, Institute of Electrical and Electronics Engineers, New York, New York (Jun. 2013).

"Split Architecture for Large Scale Wide Area Networks," Deliverable D3.3, SPARC ICT-258457, pp. 1-129, Internet Citation, XP002701201, (Aug. 2012).

* cited by examiner

VIRTUAL NETWORK PROTECTION METHOD AND APPARATUS

CROSS-REFERENCE TO RELATED APPLICATIONS

This application is a continuation of International Application No. PCT/CN2015/076916, filed on Apr. 17, 2015, the disclosure of which is hereby incorporated by reference in its entirety.

TECHNICAL FIELD

The present disclosure relates to the field of communications technologies, and in particular, to a virtual network protection method and apparatus.

BACKGROUND

As Internet technologies develop, especially as data centers (DC) develop rapidly, clients' requirements on transport network traffic are increasingly high. In addition, as clients' dynamically changing requirements constantly increase, a conventional manner of leasing a fixed dedicated line or a dedicated network service can no longer meet this type of dynamic requirements for large bandwidth changes.

In order to effectively improve resource utilization efficiency and provide a client with sufficient configuration flexibility, a physical network may be abstracted by using a network virtualization technology, and then partitioned to construct different virtual networks according to a service access requirement (for example, how to connect multiple client DCs) of a client, where the virtual networks are provided to the client as a whole. Further, a client dynamically establishes, according to a service characteristic and a requirement of the client, a connection between two service access nodes of the client on a virtual network leased by the client, to transmit data of the client. In network virtualization, a physical network resource is sliced into virtual network resources at a fine granularity by using a virtualization technology on a shared physical platform, and abstraction, slicing, and combination are further performed based on the virtual network resources, to form multiple parallel programmable virtual networks that are mutually isolated. By using the network virtualization technology, multiple virtual networks may be provided on a physical network for different users to use. These users are not affected by each other, and users using the virtual network have same user experience as those exclusively using the physical network.

Definitions of a network and a resource are as follows: Resources may be considered as discrete network components, such as a node, a link, and bandwidth on a link. A network may be considered as a pool for storing these resources, and these resources are combined orderly to form a specific shape, so as to form a network topology. Currently, an operator mostly provides a connection service to a client. A connection means that some resources are selected, and these resources are linked together to implement end-to-end transmission of a service. Along with population of data center-type applications, an operator may consider providing a virtual network service to a client, that is, providing the client with a virtual network (including resources). This brings the client more flexibility, and the client may establish a connection by itself on a virtual network leased by the client. The network, the resource, and the connection herein may include a physical network, a physical resource, and a physical connection, and may further include a virtual network, a virtual resource, and a virtual connection.

On a transport network, according to operation and maintenance habits of a transport network operator, when a transport connection service is provided to a client, protection and recovery capabilities generally need to be provided at the same time to ensure reliability of a service connection. This is also applicable when a virtual network service is provided to a client. That is, when a fault occurs on a virtual network, the operator needs to help the client quickly recover a virtual network resource leased by the client, and recover transmission of various types of service data carried on the virtual network. In the prior art, protection and recovery are usually available only to an established service connection. For example, in terms of protection, when establishing a connection for a client, a transport operator establishes two connections that have a same source and sink, one as a working path and the other as a protection path, thereby implementing 1+1 or 1:1 connection protection. When the working path is normal, service data is transmitted on the working path. When a fault occurs on the working path, service data is switched to the protection path for transmission. In the prior art, protection and recovery are available to an established service connection only. For example, if protection and recovery are only available to an established connection on a virtual network, when a fault occurs on a link resource that is on the virtual network and on which no connection is established, the virtual network cannot be protected. This reduces user experience of a client.

SUMMARY

In view of this, embodiments of the present disclosure provide a virtual network protection method and apparatus, to resolve a problem that when a fault occurs on a virtual network, the virtual network cannot be protected.

According to a first aspect, an embodiment of the present disclosure provides a virtual network protection method, including: receiving a virtual network topology establishment request message, where the virtual network topology establishment request message carries a virtual network resource parameter and/or a virtual network protection and recovery type; reserving a working physical resource and a protection physical resource in an idle physical resource of a physical network according to the virtual network resource parameter and/or the virtual network protection and recovery type; and mapping a virtual link on a virtual network to the working physical resource and the protection physical resource.

According to a second aspect, an embodiment of the present disclosure provides a virtual network protection apparatus, comprising:

a receiver, configured to receive a virtual network topology establishment request message, wherein the virtual network topology establishment request message carries a virtual network resource parameter and/or a virtual network protection and recovery type;

a processor, configured to reserve a working physical resource and a protection physical resource in an idle physical resource of a physical network according to the virtual network resource parameter and/or the virtual network protection and recovery type; and map a virtual link on a virtual network to the working physical resource and the protection physical resource.

BRIEF DESCRIPTION OF DRAWINGS

To describe the technical solutions in the embodiments of the present disclosure more clearly, the following briefly describes the accompanying drawings required for describing the background and the embodiments. Apparently, the accompanying drawings in the following description show merely some embodiments of the present disclosure, and a person of ordinary skill in the art may still derive other accompanying drawings or embodiments according to these drawings or description without creative efforts, and the present disclosure is intended to cover all these derived accompanying drawings or embodiments.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
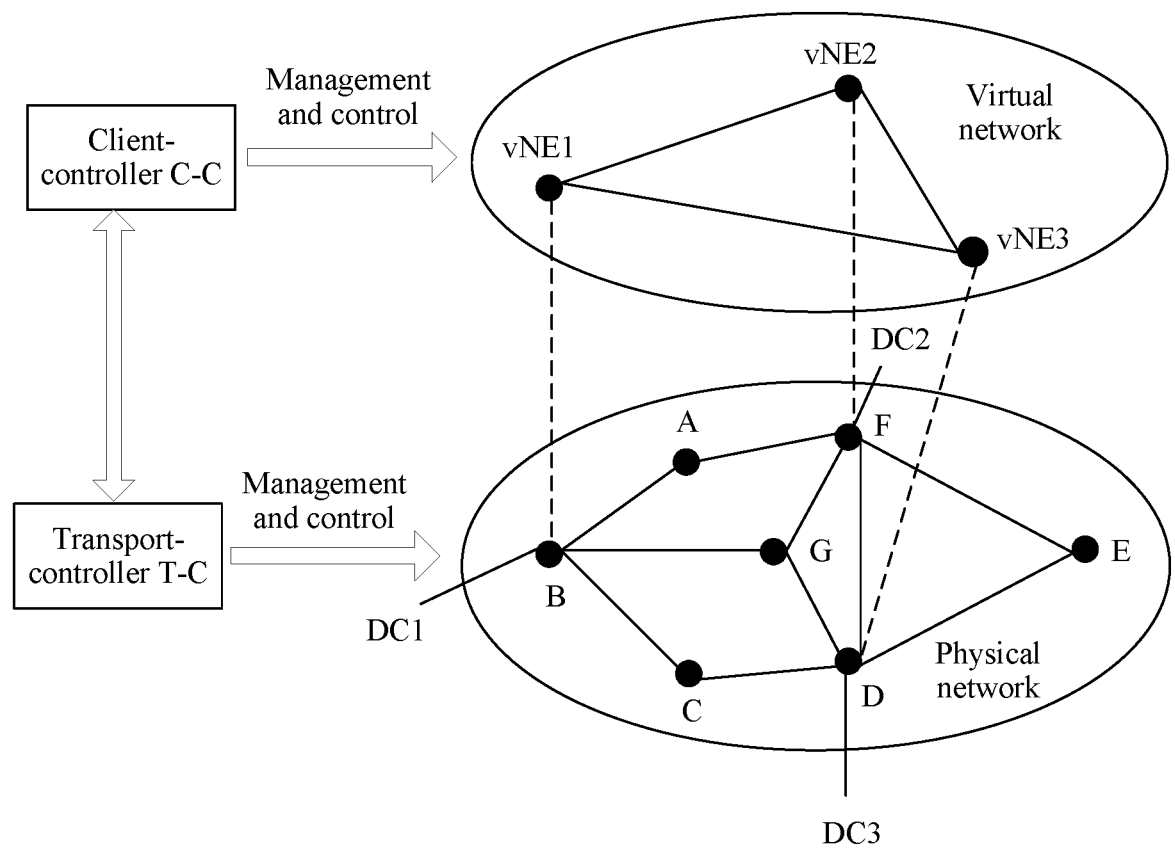
FIG. 1 is a diagram of a physical network virtualization architecture.

FIG. 1 is a diagram of a physical network virtualization architecture according to an embodiment of the present disclosure. The physical network virtualization architecture includes a virtual network layer and a physical network layer (that is, an infrastructure network layer). The physical network layer includes many underlying basic networks. An underlying basic network is constituted by connecting physical nodes by using a physical link, and is generally considered as a physical network constituted by means of mutual connection of infrastructure resources. Common physical nodes include routers, switches, and the like, and physical links include optical fibers, cables, twisted pairs, and the like. The virtual network layer includes many virtual networks. A virtual network is constituted by connecting virtual nodes by using a virtual link, and is generally considered as a logical network constituted on an underlying basic network by using a virtualization technology.

Specifically, a physical network shown in FIG. 1 may be an OTN (Optical Transport Network). Certainly, in the embodiments of the present disclosure, the physical network may also be an access network, a core network, or the like. In FIG. 1, a physical network of the optical transport network includes seven nodes: A, B, C, D, E, F, and G. Each node may be an optical communications entity, such as an optical transport network OTN device. Different nodes are connected by using an optical fiber. Links on a network may be classified into types such as ODU1 (Optical Channel Data Unit 1), ODU2, ODU3, and ODU4 according to a granularity size. For example, it is assumed that all links on the network are ODU2 links, and have a bandwidth of 10 Gbps. On the optical transport network, a network device, for example, a transport-controller (T-C) connects to each physical node by using a control plane, so as to control the physical network. Specifically, each physical node may have a control message processing unit, and control message processing units of multiple physical nodes are interconnected by using the physical network, so as to form a control plane. The control plane is responsible for completing a call control function and a connection control function, and can recover a connection when a fault occurs. The T-C may be an independent server, and has a CPU, a memory, and the like. The T-C may also be implemented on a physical node. In this case, the physical node needs to have all functions of a transport-controller. Status collection/monitoring, connection establishment/modification/deletion, fault detection, protection and recovery, or the like may be performed on the physical network by using the T-C. For example, a transport operator may establish an end-to-end service connection on the physical network according to a service requirement of a client, and a service is carried by using the established service connection. In addition, the transport-controller may perform modification, deletion, or the like on the established service connection.

It is assumed that a client has three DCs: a DC1, a DC2, and a DC3, and needs to lease the physical network on the transport network to transmit traffic between the DC1, the DC2, and the DC3. The DC1, the DC2, and the DC3 are respectively connected to the nodes B, F, and D of the physical network. Therefore, the nodes B, F, and D are service access nodes of the client. The physical network shown in FIG. 1 may be provided by a transport operator. In addition, a virtual network that has a specific service and has a topology structure expected by a client may be provided to the client by mapping the virtual network to a physical resource of the physical network. The physical resource includes a physical node resource and a physical link resource. The physical node resource may include a computing resource and a forwarding resource, and the computing resource and the forwarding resource may include a processing capability resource of a CPU on the physical node. The physical link resource may include, for example, a bandwidth resource, a delay, and a reliability resource. A process of implementing virtual network mapping may include two steps: virtual node mapping and virtual link mapping. Virtual node mapping is a process of mapping a virtual node on a virtual network to a corresponding physical node on a physical network. Virtual link mapping is a process of mapping a virtual link on the virtual network to a corresponding physical path on the physical network. A virtual network mapping process is a process of mapping, matching, and configuring a physical network topology and a virtual network topology. Based on a shared physical network platform, the following problem needs to be considered in virtual network mapping: how to find an appropriate physical node for a virtual node on the virtual network topology and an appropriate physical link for a virtual link on the virtual network topology, thereby forming a physical network topology as a mapping result. Certainly, various constraint conditions need to be considered in a mapping process, such as a computing resource requirement of the virtual node, a bandwidth or delay requirement of the virtual link, or a topology requirement. A virtual network is constructed based on a client requirement. Therefore, a topology of a virtual network, a resource constraint, and the like vary according to different client requirements. For example, on a virtual network, each virtual node requires a 1 GHz CPU resource, and each virtual link requires a 10 Mbps bandwidth resource. In addition, there may be another constraint condition. For example, a constraint on a geographical location from the virtual node, and a constraint on aspects such as a delay time and a packet loss rate during data transmission on the virtual link. In the mapping process, constraints on these resource requirements from the virtual network need to be met. For example, a virtual network provided to a client includes a virtual network element vNE1 (Virtual Network Element 1), a vNE2, and a vNE3, and a physical resource of the physical network is mapped to the virtual network, constituting a mapping relationship between a physical network topology and a virtual network topology. Herein, a virtual network element is a virtual node. For example, the virtual network elements vNE1, vNE2, and vNE3 are respectively mapped to the physical nodes B, F, and D on the physical network. A virtual link vNE1-vNE2 is mapped to two physical links (working paths) B-A and A-F on the physical network, and two physical links (protection paths) B-G and G-F on the physical network. A virtual link vNE1-vNE3 is mapped to two physical links (working paths) B-C and C-D on the physical network, and two physical links (protection paths) B-G and G-D on the physical network. A virtual link vNE2-vNE3 is mapped to a physical link (working path) F-D on the physical network, and two physical links (protection paths) F-E and E-D on the physical network. Transmission traffic between the DC1 and the DC2 may be carried between the vNE1 and the vNE2, transmission traffic between the DC1 and the DC3 may be carried between the vNE1 and the vNE3, and transmission traffic between the DC2 and the DC3 may be carried between the vNE2 and the vNE3. A virtual network leased by a client is controlled by using a C-C(Client-Controller). Specifically, the C-C may be an independent server or computer device. Connection establishment, connection modification, connection deletion, or the like may be performed on the virtual network by using the C-C. For example, a client may establish an end-to-end service connection on the virtual network by using the C-C and according to a service requirement, and a service is carried by using the established service connection. In addition, the client may perform modification, deletion, or the like on the established service connection.

The following concepts are used in the following description process, and are explained herein:

Virtual link: a connection between any two adjacent virtual nodes on a virtual network topology. A virtual link provides a bandwidth resource that may be used by one or more virtual connections.

Virtual connection: a path connection, from a source virtual node to a sink virtual node on a virtual network topology, used to carry a data service. A virtual connection passes through at least one virtual link, and occupies a part of or all bandwidth resources in the virtual link through which the virtual connection passes.

Physical link: a connection between any two adjacent physical nodes on a physical network topology. A physical link provides a bandwidth resource that may be used by one or more physical connections. Physical connection: a path, from a source physical node to a sink physical node on a physical network topology, used to carry a data service. A physical connection passes through at least one physical link, and occupies a part of or all bandwidth resources in the physical link passed through.

Figure 2:
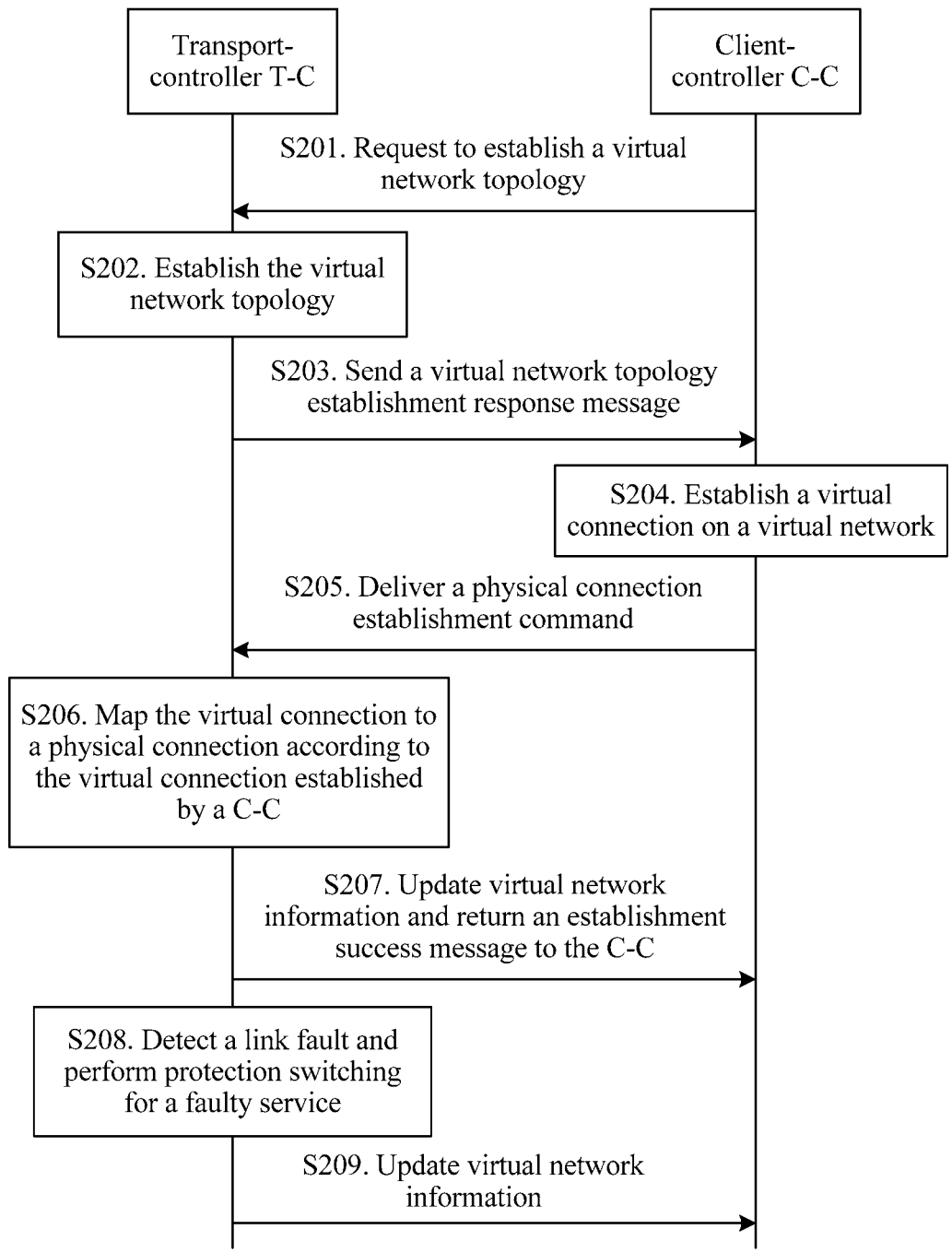
FIG. 2 is a diagram of signaling exchange of a virtual network protection method for implementing an embodiment of the present disclosure.

FIG. 2 is a diagram of signaling exchange of a virtual network protection method according to an embodiment of the present disclosure. In this embodiment, a T-C performs management and control on a physical network, and a C-C performs management and control on a virtual network. The T-C and the C-C establish a virtual network topology by means of signaling exchange. In a process of establishing the virtual network topology, the T-C provides a working physical resource and a protection physical resource for the virtual network. When a fault occurs on a working physical resource corresponding to a virtual link on the virtual network, a protection physical resource corresponding to the virtual link may be used. In this embodiment of the present disclosure, the T-C and the C-C may be independent network entities, or may be in a same network entity. A specific implementation process is as follows.

S201. The C-C requests the T-C to establish a virtual network topology.

The C-C sends a virtual network topology establishment request message to the T-C. The virtual network topology establishment request message carries one or both of a virtual network resource parameter and a virtual network protection and recovery type. In a specific implementation process, the virtual network resource parameter may include transmission traffic between any two service access nodes, or may include virtual network topology information. The virtual network topology information may include virtual node information and virtual link information. The virtual node information may include a node identifier of each virtual node on the virtual network topology. The virtual link information may include a connection relationship between virtual nodes and transmission bandwidth of a virtual link. Specifically, the virtual network protection and recovery type may include 1+1 virtual topology protection, 1:1 virtual topology protection, and the like. In 1+1 virtual topology protection, for physical nodes corresponding to virtual nodes at two ends of each virtual link, using configuration for a single direction as an example, a dual feed connection is configured for a transmit end. That is, a service is sent on both a working path and a protection path; and a selective receiving connection is configured for a receive end, so that a service may be received from the working path or the protection path selectively according to, for example, a fault status of the link. In 1:1 virtual topology protection, for physical nodes corresponding to virtual nodes at two ends of each virtual link, using configuration for a single direction as an example, a selective bridging connection is configured for a transmit end, so that a service may be sent from a working path or a protection path selectively according to, for example, a fault status of the link; and a selective receiving connection is configured for a receive end, so that a service may be received from the working path or the protection path according to a fault status of the link. Because a link and a service on a transport network are usually bidirectional, generally both sending and receiving are configured on a node at one end of the link.

In an example of an implementation of the present disclosure, the T-C establishes a virtual network topology. Specifically, the virtual network resource parameter includes information about a requirement of a client for a virtual network resource. For example, the virtual network resource parameter may include traffic requirement matrix information between any two DCs. Table 1 describes traffic requirement matrix information between every two of the three DCs shown in FIG. 1.

TABLE 1

| DC connection relationship | Traffic |
|---|---|
| DC1-DC2 | 3.75 Gbps |
| DC1-DC3 | 7.5 Gbps |
| DC2-DC3 | 5 Gbps |

In another example, the C-C plans a virtual network topology. Specifically, the C-C may plan, according to traffic requirement matrix information between any two DCs, a virtual network topology meeting traffic requirement matrix information between DCs. The virtual network resource parameter includes virtual network topology information planned by the C-C, such as virtual node information and virtual link information. Table 2 describes virtual network topology information shown in FIG. 1.

TABLE 2

| Virtual link | Transmission bandwidth |
|---|---|
| vNE1-vNE2 | 3.75 Gbps |
| vNE1-vNE3 | 7.5 Gbps |
| vNE2-vNE3 | 5 Gbps |

The planned virtual network topology meets the traffic requirement matrix information of the client. For example, required traffic of 3.75 Gbps between the DC1 and the DC2 may be carried on vNE1-vNE2;

required traffic of 7.5 Gbps between the DC1 and the DC3 may be carried on vNE1-vNE3; and required traffic of 5 Gbps between the DC2 and the DC3 may be carried on vNE2-vNE3.

S202. The T-C establishes a virtual network topology for the C-C.

The T-C plans a working physical resource and a protection physical resource in an idle physical resource of the physical network according to the virtual network resource parameter and the virtual network protection and recovery type in the virtual network topology establishment request message sent by the C-C, and maps the virtual network to the working physical resource and the protection physical resource. The idle physical resource of the physical network includes an available physical resource that is not leased to or reserved for the virtual network, and that is not used by another connection. Preferably, the working physical resource and the protection physical resource are physically separated. In a specific implementation process, as an example for illustration, the virtual network protection and recovery type is 1+1 virtual topology protection or 1:1 virtual topology protection.

In an example of an implementation of the present disclosure, the T-C establishes a virtual network topology. The T-C may plan a virtual network topology according to a traffic requirement between any two DCs that is sent by the C-C. In addition, the T-C may plan two physical network resources in the idle physical resource of the physical network according to traffic requirement matrix information between any two DCs that is sent by the C-C and according to the virtual network protection and recovery type. For example, according to the traffic requirement matrix information between the DCs described in Table 1, the T-C may reserve a working physical resource of 3.75 Gbps on physical links B-A and A-F, and reserve a protection physical resource of 3.75 Gbps on physical links B-G and G-F. The T-C may reserve a working physical resource of 7.5 Gbps on physical links B-C and C-D, and reserve a protection physical resource of 7.5 Gbps on physical links B-G and G-D. The T-C may reserve a working physical resource of 5 Gbps on a physical link F-D, and reserve a protection physical resource of 5 Gbps separately on physical links F-E and E-D. Preferably, to avoid a conflict between a working physical resource and a protection physical resource, a working physical resource and a protection physical resource of each link are physically separated from each other. B is a service access node of the DC1, F is a service access node of the DC2, and D is a service access node of the DC3.

The T-C maps the virtual network topology vNE1-vNE2-vNE3 to the reserved working physical resource and the reserved protection physical resource. The virtual node vNE1 is corresponding to a part of or all resources of the physical node B, the virtual node vNE2 is corresponding to a part of or all resources of the physical node F, and the virtual node vNE3 is corresponding to a part of or all physical resources of the physical node D. A virtual link vNE1-vNE2 is corresponding to the working physical resource reserved on the physical links B-A and A-F on the physical network, and the protection physical resource reserved on the physical links B-G and G-F on the physical network. A virtual link vNE1-vNE3 is corresponding to the working physical resource reserved on the physical links B-C and C-D on the physical network, and the protection physical resource reserved on the physical links B-G and G-D on the physical network. A virtual link vNE2-vNE3 is corresponding to the working physical resource reserved on the physical link F-D on the physical network, and the protection physical resource reserved on the physical links F-E and E-D on the physical network.

The planned virtual network topology meets the traffic requirement matrix information of the client. For example, required traffic of 3.75 Gbps between the DC1 and the DC2 may be carried on vNE1-vNE2;

required traffic of 7.5 Gbps between the DC1 and the DC3 may be carried on vNE1-vNE3; and required traffic of 5 Gbps between the DC2 and the DC3 may be carried on vNE2-vNE3.

In another example, the C-C plans a virtual network topology. The T-C may plan two physical network resources in the idle physical resource of the physical network according to the pre-planned virtual network topology information that is of the virtual network and that is sent by the C-C, such as the virtual node information, the virtual link information, and the virtual network protection and recovery type. For example, according to the virtual network topology information described in Table 2, the T-C may reserve a working physical resource of 3.75 Gbps on physical links B-A and A-F, and reserve a protection physical resource of 3.75 Gbps on physical links B-G and G-F. The T-C may reserve a working physical resource of 7.5 Gbps on physical links B-C and C-D, and reserve a protection physical resource of 7.5 Gbps on physical links B-G and G-D. The T-C may reserve a working physical resource of 5 Gbps on a physical link F-D, and reserve a protection physical resource of 5 Gbps separately on physical links F-E and E-D. Preferably, to avoid a conflict between a working physical resource and a protection physical resource, a working physical resource and a protection physical resource of each link are physically separated from each other. B is a service access node of the DC1, F is a service access node of the DC2, and D is a service access node of the DC3.

The T-C maps a reserved working physical resource and a reserved protection physical resource to the virtual network topology vNE1-vNE2-vNE3 pre-planned by the C-C. The virtual node vNE1 is corresponding to a part of or all physical resources of the physical node B, the virtual node vNE2 is corresponding to a part of or all physical resources of the physical node F, and the virtual node vNE3 is corresponding to a part of or all physical resources of the physical node D. A virtual link vNE1-vNE2 is corresponding to the working physical resource reserved on the physical links B-A and A-F on the physical network, and the protection physical resource reserved on the physical links B-G and G-F on the physical network. A virtual link vNE1-vNE3 is corresponding to the working physical resource reserved on the physical links B-C and C-D on the physical network, and the protection physical resource reserved on the physical links B-G and G-D on the physical network. A virtual link vNE2-vNE3 is corresponding to the working physical resource reserved on the physical link F-D on the physical network, and the protection physical resource reserved on the physical links F-E and E-D on the physical network.

S203. The T-C sends a virtual network topology establishment response message to the C-C.

After the T-C establishes the virtual network topology, the T-C stores the virtual network, and maintains information about the virtual network, such as virtual network topology information of the virtual network, a virtual network protection and recovery type, a mapping relationship between the virtual network topology and a working physical resource on the physical network, and a mapping relationship between the virtual network topology and a protection physical resource on the physical network. The virtual network topology information includes virtual node information and virtual link information. The virtual link information includes transmission bandwidth and the like of a virtual link. The mapping relationship between the virtual network topology and a working physical resource on the physical network and the mapping relationship between the virtual network topology and a protection physical resource on the physical network may include: a mapping relationship between a virtual node and a physical node, a mapping relationship between a virtual link and a physical link, and a mapping relationship between a bandwidth resource on a virtual link and a bandwidth resource on a physical link. In addition, the T-C sends the virtual network topology establishment response message to the C-C.

In an example of an implementation of the present disclosure, the T-C establishes a virtual network topology. The virtual network topology establishment response message sent by the T-C to the C-C carries information indicating virtual network topology establishment success, and may further carry the virtual network topology information, such as the virtual node information and the virtual link information. In another example, the C-C plans a virtual network topology. The virtual network topology establishment response message sent by the T-C to the C-C carries the information indicating virtual network topology establishment success, but may not carry the virtual network topology information.

S204. The C-C establishes a virtual connection on a virtual network.

After obtaining the virtual network topology information, the C-C may control the virtual network. For example, the C-C establishes a connection on the virtual network to transmit a service between DCs. In a specific implementation process, the C-C calculates, according to resource information of the virtual network and information about an actual traffic requirement during service transmission between DCs, a virtual connection that is on the virtual network and that meets a traffic requirement between a source DC and a sink DC.

For example, it is assumed that a connection with a bandwidth of 1.25 Gbps needs to be established between the DC1 and the DC3, and a path that is on the virtual network topology and that is calculated by the C-C is vNE1-vNE2-vNE3. The C-C reserves a resource of 1.25 Gbps separately on virtual links vNE1-vNE2 and vNE2-vNE3, and establishes a virtual connection vNE1-vNE2-vNE3. A virtual node does not have an entity, and is merely node information stored in the C-C and the T-C. Therefore, the "establishment of a virtual connection" herein is essentially as follows: The C-C changes virtual node information and virtual link information in a database that stores the virtual network. The vNE2 in the foregoing established virtual connection vNE1-vNE2-vNE3 is used as an example, that is, the C-C stores a piece of information about "a cross connection between a resource of 1.25 G on the left of the vNE2 and a resource of 1.25 G on the right of the vNE2".

S205. The C-C delivers a physical connection establishment command to the T-C.

After establishing the virtual connection vNE1-vNE2-vNE3 on the virtual network, the C-C sends the physical connection establishment command to the T-C. A cross connection between virtual nodes is mapped to a cross connection between physical nodes on the physical network, so that a physical connection corresponding to the virtual connection vNE1-vNE2-vNE3 is established.

S206. The T-C maps the virtual connection to a physical connection according to the virtual connection established by the C-C.

After receiving the physical connection establishment command sent by the C-C, the T-C maps the virtual connection vNE1-vNE2-vNE3 of the virtual network to the reserved working physical resource and protection physical resource on the physical network according to the stored virtual network topology information, information about the mapping relationship between the virtual network topology and a working physical resource on the physical network and the mapping relationship between the virtual network topology and a protection physical resource on the physical network, and virtual network protection and recovery type; and delivers a cross connection establishment command to corresponding physical nodes. A cross connection is established on physical nodes that are passed through, to establish a corresponding physical connection, so as to meet a virtual connection establishment requirement of the C-C. The T-C delivers a physical node cross connection command to the physical nodes for establishing a cross connection, so as to form a physical connection corresponding to the virtual connection.

In 1+1 virtual topology protection, for physical nodes corresponding to virtual nodes at two ends of each virtual link, using configuration for a single direction as an example, the T-C configures a dual feed connection for a service transmit end, that is, a service is sent on both a working path and a protection path; and the T-C configures a selective receiving connection for a service receive end, that is, a service is received from the working path or the protection path. Because a link and a service on a transport network are usually bidirectional, a node at one end of a link serves as a transmit end node in one direction and a receive end node in the other direction. Therefore, a dual feed connection is usually configured on a node at one end of a link for sending a service, and a selective receiving connection is also configured on the node for receiving a service from a working path or a protection path selectively according to a fault status of a service, a path, a link, or the like. The T-C configures a cross connection for a service on each intermediate node, in each virtual link, through which a working physical resource and a protection physical resource pass.

In 1:1 virtual topology protection, for a physical node corresponding to a virtual node at a transmit end of each virtual link, using configuration for a single direction as an example, the T-C configures a selective bridging connection for a service transmit end, that is, a service is sent from a working path or a protection path selectively according to a fault status of a service, a path, a link, or the like. The T-C configures a selective receiving connection for a service receive end, so as to receive a service from a working path or a protection path selectively according to a fault status of a service, a path, a link, or the like. Because a link and a service on a transport network are usually bidirectional, a node at one end of a link serves as a transmit end node in one direction and a receive end node in the other direction. Therefore, a selective bridging connection is usually configured on a node at one end of a link for sending a service, and a selective receiving connection is also configured on the node for receiving a service from a working path or a protection path selectively according to a fault status of a service, a path, a link, or the like. The T-C configures a cross connection for a service on each intermediate node, in each virtual link, through which a working physical resource and a protection physical resource pass.

It should be noted that, because a link and a service on a transport network are usually bidirectional, a node at one end of a link serves as a transmit end node in one direction and a receive end node in the other direction. Because the two directions are symmetric, in the following description, only one direction is described.

Figure 3:
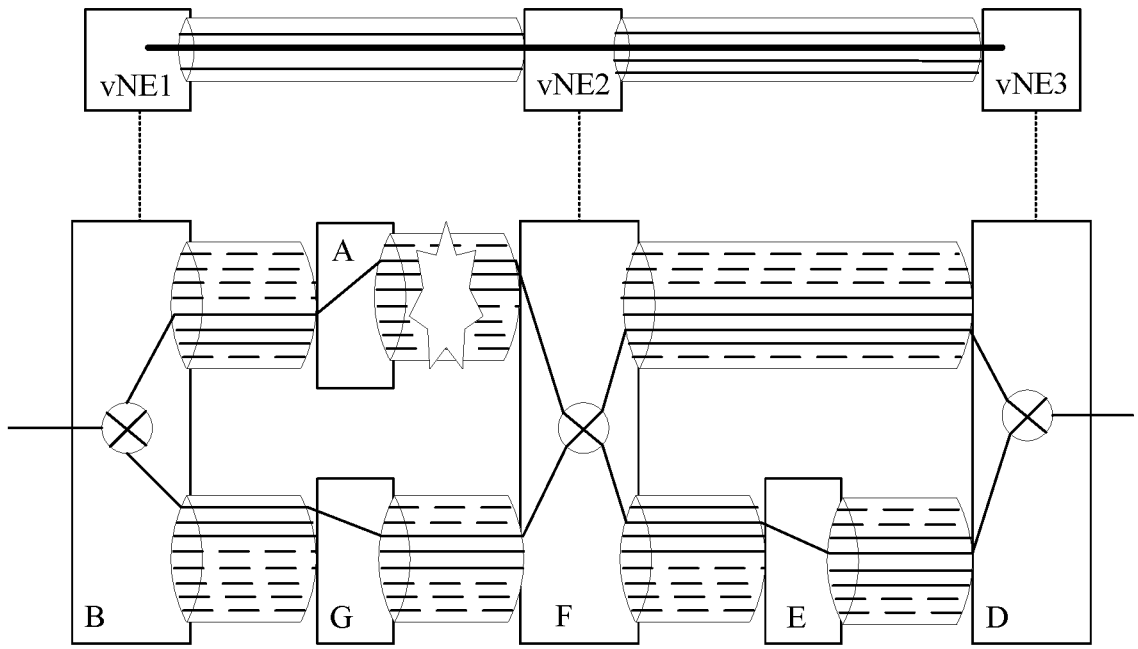
FIG. 3 is a structural diagram of physical network resource allocation for implementing an embodiment of the present disclosure.

When the transport network is an OTN, it is assumed that each link on the physical network is an ODU2 link with a bandwidth of 10 Gbps, bandwidth resources in the link are discrete, and each bandwidth resource of 1.25 Gbps is one timeslot, the ODU2 link has eight timeslots in total. For example, as shown in FIG. 3, there are eight solid lines and dashed lines in total in a physical link (for example, B-A), which represent eight timeslots on the ODU2 link. A dashed line part represents a timeslot that is in the physical link and that is not occupied by the virtual network, and a solid line part represents a timeslot that is in the physical link and that is occupied by the virtual network. FIG. 3 shows a mapping relationship between a physical network and a virtual network. For example, virtual nodes vNE1, vNE2, and vNE3 are respectively mapped to physical nodes B, F, and D. Specifically, when a virtual network protection and recovery type is 1+1 virtual topology protection, for a virtual link vNE1-vNE2, the T-C allocates one timeslot resource (with a bandwidth of 1.25 Gbps) of three timeslot resources reserved on physical links B-A and A-F through which a working physical resource corresponding to the virtual link passes, and allocates one timeslot resource of three timeslot resources reserved on physical links B-G and G-F through which a protection physical resource corresponding to the virtual link passes. The T-C performs the following operations: configuring a dual feed connection "from an access-side port of the DC1 to one timeslot allocated to B-A" and "from the access-side port of the DC1 to one timeslot allocated to B-G" on the first node of a service, that is, the node B; configuring a cross connection "from one timeslot allocated to B-A to one timeslot allocated to A-F" on the node A; and configuring a cross connection "from one timeslot allocated to B-G and one timeslot allocated to G-F" on the node G.

For a virtual link vNE2-vNE3, the T-C allocates one timeslot resource of four timeslot resources reserved on a physical link F-D through which a working physical resource corresponding to the virtual link passes, and allocates one timeslot resource of four timeslot resources reserved on physical links F-E and E-D through which a protection physical resource corresponding to the virtual link passes. The T-C performs the following operations: configuring a cross connection on the node F, so that the node F selectively receives "from one timeslot allocated to A-F" or "from one timeslot allocated to G-F", and also configuring a dual feed connection between "one timeslot allocated to F-D" and "one timeslot allocated to F-E; configuring a cross connection "from one timeslot allocated to F-E to one timeslot allocated to E-D" on the node E; and configuring a selective receiving connection "from one timeslot allocated to F-D to an access-side port of the DC3" and "from one timeslot allocated to E-D to the access-side port of the DC3" on the last node of the service, that is, the node D.

Specifically, when a virtual network protection and recovery type is 1:1 virtual topology protection, for a virtual link vNE1-vNE2, the T-C allocates one timeslot resource of three timeslot resources reserved on physical links B-A and A-F through which a working physical resource corresponding to the virtual link passes, and allocates one timeslot resource of three timeslot resources reserved on physical links B-G and G-F through which a protection physical resource corresponding to the virtual link passes. The T-C performs the following operations: configuring a selective bridging connection "from an access-side port of the DC1 to one timeslot allocated to B-A" and "from the access-side port of the DC1 to one timeslot allocated to B-G" on the first node of a service, that is, the node B, and establishing a bridging connection to one timeslot allocated to B-A; configuring a cross connection "from one timeslot allocated to B-A to one timeslot allocated to A-F" on the node A; and configuring a cross connection "from one timeslot allocated to B-G to one timeslot allocated to G-F" on the node G.

For a virtual link vNE2-vNE3, the T-C allocates one timeslot resource of four timeslot resources reserved on a physical link F-D through which a working physical resource corresponding to the virtual link passes, and allocates one timeslot resource of four timeslot resources reserved on physical links F-E and E-D through which a protection physical resource corresponding to the virtual link passes. The T-C performs the following operations: configuring a cross connection on the node F, so that the node F selectively receives "from one timeslot allocated to A-F" or "from one timeslot allocated to G-F", and also configuring a selective bridging connection between "one timeslot allocated to F-D" and "one timeslot allocated to F-E", and establishing a bridging connection to one timeslot allocated to F-D; configuring a cross connection "from one timeslot allocated to F-E to one timeslot allocated to E-D" on the node E; and configuring a selective receiving connection "from one timeslot allocated to F-D to an access-side port of the DC3" and "from one timeslot allocated to E-D to the access-side port of the DC3" on the last node of the service, that is, the node D.

S207. The T-C updates virtual network topology information, and returns a connection establishment success message to the C-C.

After establishing a physical connection for the C-C, the T-C updates the virtual network topology information. For example, a bandwidth resource of 1.25 Gbps in a working physical resource corresponding to the virtual connection vNE1-vNE2-vNE3 and a bandwidth resource of 1.25 Gbps in a protection physical resource corresponding to the virtual connection vNE1-vNE2-vNE3 are occupied, and the T-C returns the connection establishment success message to the C-C.

S208. The T-C detects that a link corresponding to a working physical resource is faulty, and performs service protection switching.

Specifically, a physical link fault detection manner includes: detecting a fault on a node at a downstream end of a faulty physical link for a unidirectional service, and detecting faults on nodes at both ends of a faulty physical link for a bidirectional service.

In one case, when a fault occurs on a physical link in a working physical resource, if the faulty physical link carries a service, a virtual link corresponding to the faulty physical link is affected by the fault. A physical node corresponding to an end node of the virtual link affected by the fault switches the service to a protection path. The protection path uses a protection physical resource corresponding to the virtual link affected by the fault.

Specifically, in FIG. 3, it is assumed that a fault occurs on a physical link A-F. When a virtual network protection and recovery type is 1+1 virtual topology protection, when a physical link fault is detected, the physical node F corresponding to the virtual node vNE2 at a receive end of the virtual link vNE1-vNE2 chooses to receive a service from one timeslot allocated to a physical link G-F of a protection physical resource.

When a virtual network protection and recovery type is 1:1 virtual topology protection, when a physical link fault is detected, the physical node B corresponding to the virtual node vNE1 at a transmit end of the virtual link vNE1-vNE2 affected by the fault chooses to send a service from one timeslot allocated to a physical link B-G of a protection physical resource; and when a physical link fault is detected, the physical node F corresponding to the virtual node vNE2 at a receive end of the virtual link vNE1-vNE2 affected by the fault chooses to receive a service from one timeslot allocated to a physical link G-F of a protection physical resource.

In another case, if no service is established on a virtual link affected by a fault, protection switching does not need to be performed on the physical network. However, the T-C may record a working physical resource fault, and protection physical resource information may be used when a service is established. In a specific implementation process, physical network fault information may be reported to the T-C, so that the T-C learns a virtual network affected by a faulty physical link and a virtual link on the virtual network, and the T-C stores information about a protection capability failure that is on the virtual link affected by the fault in the virtual topology.

Specifically, after detecting a link fault, the node A and/or the node F report/reports information about the fault to the T-C, so that the T-C learns that a fault occurs on a physical link A-F. The T-C determines, according to previously stored information about the C-C, that a resource in the faulty physical link is reserved or leased by the C-C. On a virtual network topology leased by the C-C, a fault occurs on a physical link A-F in the working physical resource corresponding to the virtual link vNE1-vNE2. If the physical link A-F carries a service, the service is switched to physical links B-G and G-F in the protection physical resource corresponding to the virtual link vNE1-vNE2. If no service is established on the physical link A-F, protection switching does not need to be performed on the physical network. The T-C only needs to record the working physical resource fault, and protection physical resource information is used when a service is established. The T-C may determine, according to a fault on the physical link A-F, that a protection capability on the virtual link vNE1-vNE2 fails. The T-C locally stores information such as the information about the protection capability failure that is on the virtual link vNE1-vNE2, or information about implementation of protection switching on the physical link corresponding to the virtual link vNE1-vNE2.

S209. The T-C updates virtual network topology information to the C-C.

After the T-C leans that a protection physical resource, on the physical network, corresponding to the virtual link affected by the fault carries a service on which protection switching is performed, or after a protection resource is used, optionally, the T-C may update the virtual network topology information to the C-C, such as the information about the protection capability failure that is on the virtual link vNE1-vNE2.

In this embodiment of the present disclosure, the transport-controller reserves the working physical resource and the protection physical resource on the physical network according to the virtual network topology establishment request message sent by the client-controller, generates the virtual network topology, and maps a virtual network to the working physical resource and the protection physical resource, so as to protect the virtual network. In this way, before a virtual connection is established, the virtual network already has a protection capability. When a fault occurs on the physical network corresponding to the virtual network, the physical network can rapidly complete protection switching. For a client, protection switching does not affect a virtual network leased by the client, a virtual network topology is not changed, and a virtual connection service established by the client on the virtual network is not changed either. The virtual connection remains unchanged after a fault occurs on the virtual network, and the virtual topology is not changed. This improves user experience.

Figure 4:
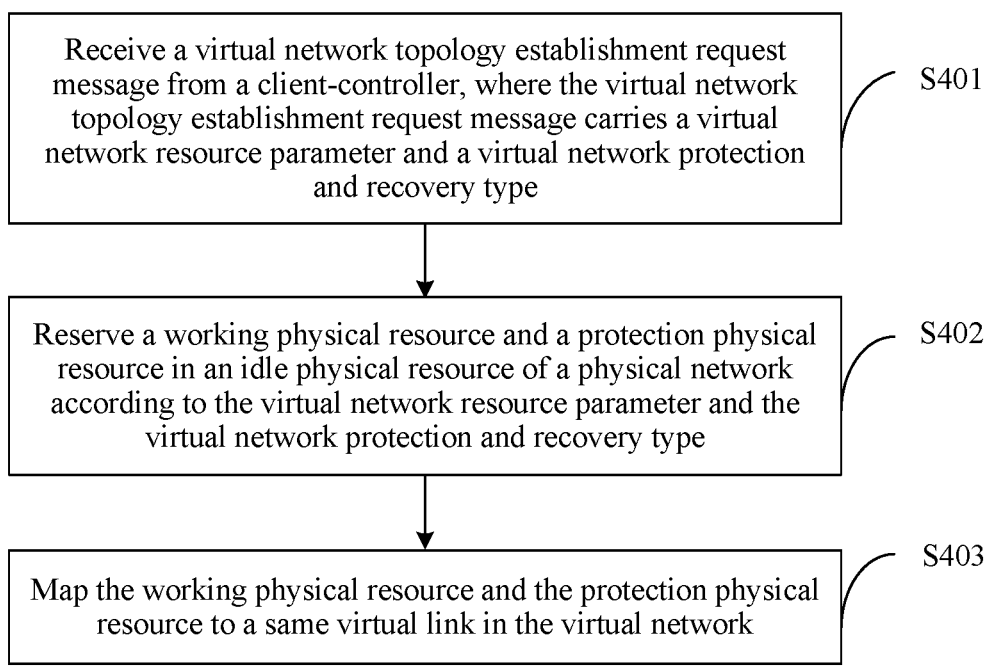
FIG. 4 is an example of a flowchart of a virtual network protection method for implementing an embodiment of the present disclosure.

FIG. 4 is an example of a flowchart of a virtual network protection method according to an embodiment of the present disclosure. In a specific implementation process, the method may be executed by an operator-side transport-controller T-C. The T-C may be a server or a computer device, and specifically performs the following steps.

S401. Receive a virtual network topology establishment request message, where the virtual network topology establishment request message carries a virtual network resource parameter and/or a virtual network protection and recovery type.

Specifically, in an implementation, the virtual network resource parameter carried in a virtual network topology establishment request message may include transmission traffic between any two service access nodes, to form traffic requirement matrix information. In another implementation, a client-controller may pre-plan a virtual network topology according to transmission traffic between any two service access nodes, that is, traffic requirement matrix information. Therefore, the virtual network resource parameter may include virtual network topology information, such as virtual node information and virtual link information. The virtual link information includes transmission bandwidth and the like of a virtual link.

The virtual network protection and recovery type includes but is not limited to 1+1 protection and 1:1 protection.

S402. Reserve a working physical resource and a protection physical resource in an idle physical resource of a physical network according to the virtual network resource parameter and/or the virtual network protection and recovery type.

In an implementation, the transport-controller reserves a working physical resource and a protection physical resource in the idle physical resource of the physical network according to transmission traffic between any two service access nodes of a client. In another implementation, the transport-controller reserves a working physical resource and a protection physical resource in the idle physical resource of the physical network according to the virtual network topology information pre-planned by the client-controller. The idle physical resource is an available physical resource that is not leased to or reserved for a virtual network and that is not used by another connection. Preferably, to avoid a resource conflict, a working physical resource and a protection physical resource may be physically separated from each other.

S403. Map a virtual link on a virtual network to the working physical resource and the protection physical resource.

Specifically, the transport-controller maps the virtual link on the virtual network to the working physical resource and the protection physical resource on the physical network, to form a virtual network topology. The transport-controller stores and maintains the virtual network topology information of the established virtual network, a mapping relationship between the virtual network topology and the working physical resource, and a mapping relationship between the virtual network topology and the protection physical resource; and returns a virtual network topology establishment response message to the client-controller. Specifically, the mapping relationship between the virtual network topology and the working physical resource and the mapping relationship between the virtual network topology and the protection physical resource may include a mapping relationship between a virtual node and a physical node, and a mapping relationship between a virtual link and a physical link.

In an implementation, the virtual network topology establishment response message sent by the transport-controller may carry information indicating virtual network topology establishment success, and may further carry the virtual network topology information, such as the virtual node information and the virtual link information. In another implementation, the virtual network topology establishment response message sent by the transport-controller may carry the information indicating virtual network topology establishment success.

In a specific implementation process, the transport-controller receives a physical connection establishment command from the client-controller. The physical connection establishment command carries virtual connection information of the virtual network. Specifically, the virtual connection information includes a virtual link through which a virtual connection passes and transmission bandwidth of the virtual link. The transport-controller establishes, according to the virtual connection information, a physical connection in a physical resource corresponding to the virtual link through which the virtual connection passes. Specifically, the physical resource corresponding to the virtual link includes a working physical resource and a protection physical resource. The physical connection includes a working physical path and a protection physical path.

When a fault occurs on a physical link in a working physical resource corresponding to the virtual network, a virtual link corresponding to the faulty physical link is affected by the fault. In an implementation, if a virtual connection is established on the virtual link affected by the fault, a physical node corresponding to an end node of the virtual link affected by the fault switches a service to a protection path. The protection path uses a protection physical resource corresponding to the virtual link affected by the fault. The T-C may store information indicating that service protection switching is implemented on the physical link corresponding to the virtual link affected by the fault. In another implementation, if no virtual connection is established on the virtual link affected by the fault, a physical node corresponding to an end node of the virtual link affected by the fault does not need to perform protection switching, but the T-C may be notified to record information about a working physical resource fault. The T-C may store information about a protection capability failure that is on the virtual link affected by the fault.

In this embodiment of the present disclosure, the transport-controller reserves the working physical resource and the protection physical resource on the physical network according to the virtual network topology establishment request message of the client-controller, generates the virtual network topology, and maps the virtual network to the working physical resource and the protection physical resource, so as to protect the virtual network. In this way, before a virtual connection is established, the virtual network already has a protection capability. When a fault occurs on the physical network corresponding to the virtual network, the physical network can rapidly complete protection switching. For a client, protection switching does not affect a virtual network leased by the client, a virtual network topology is not changed, and a virtual connection service established by the client on the virtual network is not changed either. The virtual connection remains unchanged after a fault occurs on the virtual network, and the virtual topology is not changed. This improves user experience.

Figure 5:
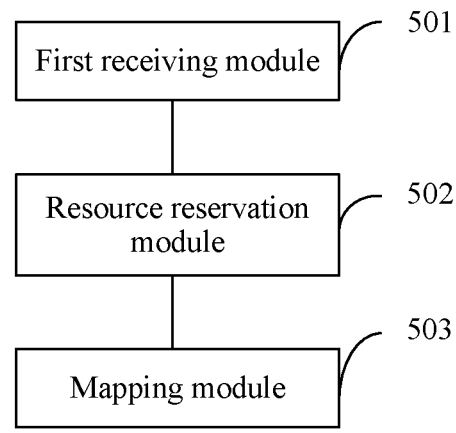
FIG. 5 is a schematic diagram of a logical structure of a transport-controller for implementing an embodiment of the present disclosure.

FIG. 5 is a schematic diagram of a logical structure of a transport-controller according to an embodiment of the present disclosure. As shown in FIG. 5, the transport-controller may be an independent server, or may be disposed as a functional unit on one physical node on a physical network. Specifically, the transport-controller may include a first receiving module 501, a resource reservation module 502, and a mapping module 503.

The first receiving module 501 is configured to receive a virtual network topology establishment request message, where the virtual network topology establishment request message carries a virtual network resource parameter and/or a virtual network protection and recovery type.

Specifically, in an implementation, the virtual network resource parameter carried in a virtual network topology establishment request message may include transmission traffic between any two service access nodes, to form traffic requirement matrix information. In another implementation, a client-controller may pre-plan a virtual network topology according to transmission traffic between any two service access nodes, that is, traffic requirement matrix information. Therefore, the virtual network resource parameter may include virtual network topology information, such as virtual node information and virtual link information. The virtual link information includes transmission bandwidth and the like of a virtual link.

The virtual network protection and recovery type includes but is not limited to 1+1 protection and 1:1 protection.

The resource reservation module 502 is configured to reserve a working physical resource and a protection physical resource in an idle physical resource of the physical network according to the virtual network resource parameter and/or the virtual network protection and recovery type.

In an implementation, the resource reservation module 502 reserves a working physical resource and a protection physical resource in the idle physical resource of the physical network according to transmission traffic between any two service access nodes of a client. In another implementation, the resource reservation module 502 reserves a working physical resource and a protection physical resource in the idle physical resource of the physical network according to the virtual network topology information pre-planned by the client-controller. The idle physical resource is an available physical resource that is not leased to or reserved for a virtual network and that is not used by another connection. Preferably, to avoid a resource conflict, a working physical resource and a protection physical resource may be physically separated from each other.

The mapping module 503 is configured to map a virtual link on a virtual network to the working physical resource and the protection physical resource.

Specifically, the mapping module 503 maps the virtual link on the virtual network to the working physical resource and the protection physical resource on the physical network, so as to form a virtual network topology. Specifically, the transport-controller may further include a storage module, configured to store and maintain virtual network topology information of the established virtual network, a mapping relationship between the virtual network topology and the working physical resource, and a mapping relationship between the virtual network topology and the protection physical resource. Specifically, the mapping relationship between the virtual network topology and the working physical resource and the mapping relationship between the virtual network topology and the protection physical resource may include a mapping relationship between a virtual node and a physical node, and a mapping relationship between a virtual link and a physical link.

In a specific implementation process, the transport-controller may further include a second receiving module, configured to receive a physical connection establishment command from the client-controller. The physical connection establishment command carries virtual connection information of the virtual network. Specifically, the virtual connection information includes a virtual link through which a virtual connection passes and transmission bandwidth of the virtual link. The transport-controller may further include a path establishment module, configured to establish, according to the virtual connection information, a physical connection in a physical resource corresponding to the virtual link through which the virtual connection passes. Specifically, the physical resource corresponding to the virtual link includes a working physical resource and a protection physical resource. The physical connection includes a working physical path and a protection physical path.

When a fault occurs on a physical link in a working physical resource corresponding to the virtual network, a virtual link corresponding to the faulty physical link is affected by the fault. Specifically, the transport-controller may further include a service switching module, configured to: when a virtual connection is established on the virtual link affected by the fault, switch a service to a protection path by a physical node corresponding to an end node of the virtual link affected by the fault. The protection path uses a protection physical resource corresponding to the virtual link affected by the fault. The storage module is configured to store information indicating that service protection switching is implemented on the physical link corresponding to the virtual link affected by the fault. The storage module is configured to: when no virtual connection is established on the virtual link affected by the fault, store information about a protection capability failure that is on the virtual link affected by the fault.

In this embodiment of the present disclosure, the transport-controller reserves the working physical resource and the protection physical resource on the physical network according to the virtual network topology establishment request message of the client-controller, generates the virtual network topology, and maps the virtual network to the working physical resource and the protection physical resource, so as to protect the virtual network. In this way, before a virtual connection is established, the virtual network already has a protection capability. When a fault occurs on the physical network corresponding to the virtual network, the physical network can rapidly complete protection switching. For a client, protection switching does not affect a virtual network leased by the client, a virtual network topology is not changed, and a virtual connection service established by the client on the virtual network is not changed either. The virtual connection remains unchanged after a fault occurs on the virtual network, and the virtual topology is not changed. This improves user experience.

Figure 6:
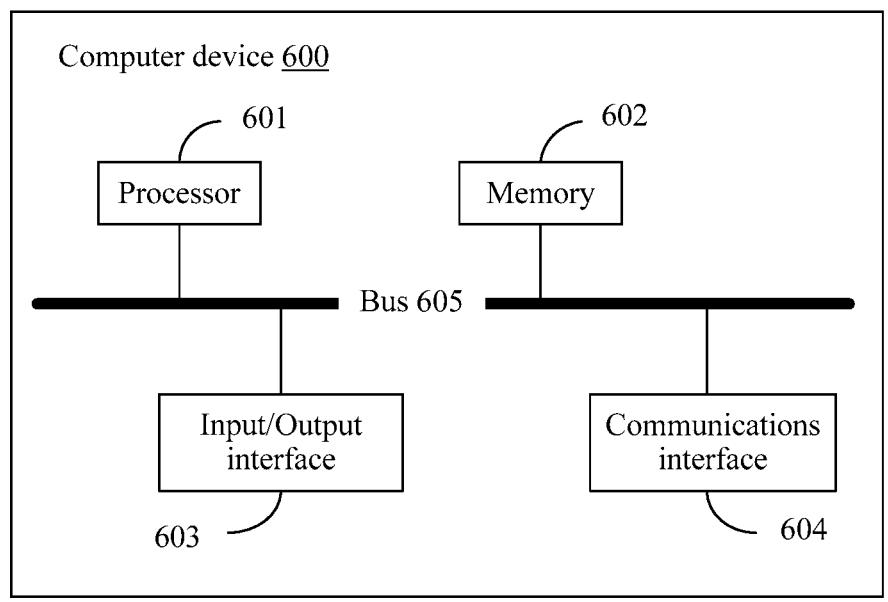
FIG. 6 is a schematic structural diagram of a computer device for implementing an embodiment of the present disclosure.

FIG. 6 is a schematic structural diagram of a computer device 600 according to an embodiment of the present disclosure. As shown in FIG. 6, the computing device 600 includes a processor 601, a memory 602, an input/output interface 603, a communications interface 604, and a bus 605. The processor 601, the memory 602, the input/output interface 603, and the communications interface 604 implement mutual communication connections by using the bus 605.

The processor 601 may be a general central processing unit (CPU), a microprocessor, an application-specific integrated circuit (ASIC), or at least one integrated circuit, and is configured to execute a related program, to implement the technical solutions provided in the embodiments of the present disclosure.

The memory 602 may be a read-only memory (ROM), a static storage device, a dynamic storage device, or a random access memory (RAM). The memory 602 may store an operating system and another application program. When the technical solutions provided in the embodiments of the present disclosure are implemented by using software or firmware, program code used to implement the technical solutions provided in the embodiments of the present disclosure is stored in the memory 602, and is executed by the processor 601.

The input/output interface 603 is configured to receive input data and information, and to output data such as an operation result.

The communications interface 604 is but is not limited to a transceiver apparatus such as a transceiver, to implement communication between the computer device 600 and another device or a communications network.

The bus 605 may include a channel, to transfer information between parts (such as the processor 601, the memory

602, the input/output interface 603, and the communications interface 604) of the computer device 600.

In a specific implementation process, the transport-controller receives a virtual network topology establishment request message by using the communications interface 604, where the virtual network topology establishment request message carries a virtual network resource parameter and/or a virtual network protection and recovery type. The processor 601 executes the code stored in the memory 602, so as to implement: reserving a working physical resource and a protection physical resource in an idle physical resource of a physical network according to the virtual network resource parameter and/or the virtual network protection and recovery type, and mapping a virtual link on a virtual network to the working physical resource and the protection physical resource.

In this embodiment of the present disclosure, the transport-controller reserves the working physical resource and the protection physical resource on the physical network according to the virtual network topology establishment request message of the client-controller, generates a virtual network topology, and maps the virtual network to the working physical resource and the protection physical resource, so as to protect the virtual network. In this way, before a virtual connection is established, the virtual network already has a protection capability. When a fault occurs on the physical network corresponding to the virtual network, the physical network can rapidly complete protection switching. For a client, protection switching does not affect a virtual network leased by the client, a virtual network topology is not changed, and a virtual connection service established by the client on the virtual network is not changed either. The virtual connection remains unchanged after a fault occurs on the virtual network, and the virtual topology is not changed. This improves user experience.

It should be noted that, although for the computer device 600, merely the processor 601, the memory 602, the input/output interface 603, the communications interface 604, and the bus 605 are shown in FIG. 6, in a specific implementation process, a person skilled in the art should understand that the computer device 600 further includes another component required for implementing normal running. In addition, a person skilled in the art should understand that, according to a specific requirement, the computer device 600 may further include a hardware component that implements another additional function. Furthermore, a person skilled in the art should understand that the computer device 600 may include merely a component required for implementing the embodiments of the present disclosure, and there is no need to include all components shown in FIG. 6.

A person of ordinary skill in the art may understand that, each aspect of the present disclosure or a possible implementation of each aspect may be specifically implemented as a system, a method, or a computer program product. Therefore, each aspect of the present disclosure or a possible implementation of each aspect may use forms of hardware only embodiments, software only embodiments (including firmware, resident software, and the like), or embodiments with a combination of software and hardware, which are uniformly referred to as a "circuit", a "module", or a "system" herein. In addition, each aspect of the present disclosure or the possible implementation of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

Computer-readable program code may be completely executed on a computer of a user, partially executed on a computer of a user, executed as a standalone software package, partially executed on a computer of a user and partially executed on a remote computer, or completely executed on a remote computer or a server. It should also be noted that, in some alternative implementation solutions, steps in a flowchart or functions specified in blocks in a block diagram may not occur in an illustrated order. For example, depending on an involved function, two consecutive steps or two blocks in the illustration may actually be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A virtual network protection method, comprising:
receiving a virtual network topology establishment request message, wherein the virtual network topology establishment request message carries a virtual network resource parameter and/or a virtual network protection and recovery type;
reserving a working physical resource and a protection physical resource in an idle physical resource of a physical network according to the virtual network resource parameter and/or the virtual network protection and recovery type;
mapping each virtual link of one or more virtual links on a virtual network to both the working physical resource and the protection physical resource before a fault is detected;
determining that a fault occurs on a first physical link in the working physical resource, wherein the first physical link that is faulty corresponds to a first virtual link on the virtual network; and in response to determining that there is a service on the first physical link that is faulty, switching the service to a protection physical path in the protection physical resource, wherein the protection physical path corresponds to the first virtual link affected by the fault.

2. The method according to claim 1, wherein the virtual network resource parameter comprises transmission traffic between any two service access nodes.

3. The method according to claim 1, wherein the virtual network resource parameter comprises virtual network topology information, and the virtual network topology information comprises at least one piece of virtual node information or virtual link information.

4. The method according to claim 1, comprising:
generating a virtual network topology according to the virtual network topology establishment request message.

5. The method according to claim 4, after the generating the virtual network topology, comprising:
storing a mapping relationship between the virtual network topology and the working physical resource, and
storing a mapping relationship between the virtual network topology and the protection physical resource.

6. The method according to claim 4, after the generating the virtual network topology, comprising:
receiving a physical connection establishment command, wherein the physical connection establishment command carries virtual connection information of the virtual network, and the virtual connection information comprises a virtual link through which a virtual connection passes and transmission bandwidth of the virtual link; and
establishing, according to the virtual connection information, a working physical path corresponding to the working physical resource and a protection physical path corresponding to the protection physical resource.

7. The method according to claim 4, after the generating the virtual network topology, comprising:
determining that a fault occurs on a second physical link on the a physical network, wherein the second physical link that is faulty corresponds to a second virtual link on the virtual network; and
storing information about a protection capability failure that is on the second virtual link, wherein the information about the protection capability failure is used to instruct the second virtual link to start a corresponding protection physical resource during establishment of a service.

8. The method according to claim 1, wherein the virtual network protection and recovery type comprises 1+1 protection and 1:1 protection.

9. A virtual network protection apparatus, comprising:
a receiver, configured to receive a virtual network topology establishment request message, wherein the virtual network topology establishment request message carries a virtual network resource parameter and/or a virtual network protection and recovery type;
a processor, configured to:
reserve a working physical resource and a protection physical resource in an idle physical resource of a physical network according to the virtual network resource parameter and/or the virtual network protection and recovery type;

map each virtual link of one or more virtual links on a virtual network to both the working physical resource and the protection physical resource before a fault is detected;
determine that a fault occurs on a first physical link in the working physical resource, wherein the first physical link that is faulty corresponds to a first virtual link on the virtual network; and
in response to determining that there is a service on the first physical link that is faulty, switch the service to a protection physical path in the protection physical resource, wherein the protection physical path corresponds to the first virtual link affected by the fault.

10. The apparatus according to claim 9, wherein the virtual network resource parameter comprises transmission traffic between any two service access nodes.

11. The apparatus according to claim 9, wherein the virtual network resource parameter comprises virtual network topology information, and the virtual network topology information comprises at least one piece of virtual node information or virtual link information.

12. The apparatus according to claim 9, wherein the processor is further configured to generate a virtual network topology according to the virtual network topology establishment request message.

13. The apparatus according to claim 12, further comprising:
a memory, configured to store a mapping relationship between the virtual network topology and the working physical resource, and to store a mapping relationship between the virtual network topology and the protection physical resource.

14. The apparatus according to claim 12, wherein
the receiver is further configured to receive a physical connection establishment command, wherein the physical connection establishment command carries virtual connection information of the virtual network, and the virtual connection information comprises a virtual link through which a virtual connection passes and transmission bandwidth of the virtual link; and
the processor is further configured to establish, according to the virtual connection information, a working physical path corresponding to the working physical resource and a protection physical path corresponding to the protection physical resource.

15. The apparatus according to claim 12, wherein
the processor is further configured to determine that a fault occurs on a second physical link on the physical network, wherein the second physical link that is faulty corresponds to a second virtual link on the virtual network; and
the memory is further configured to store information about a protection capability failure that is on the second virtual link, wherein the information about the protection capability failure is used to instruct the second virtual link to start a corresponding protection physical resource during establishment of a service.

16. The apparatus according to claim 9, wherein the virtual network protection and recovery type comprises 1+1 protection and 1:1 protection.

17. A virtual network protection method, comprising:
receiving a virtual network topology establishment request message, wherein the virtual network topology establishment request message carries a virtual network resource parameter and/or a virtual network protection and recovery type;

reserving a working physical resource and a protection physical resource in an idle physical resource of a physical network according to the virtual network resource parameter and/or the virtual network protection and recovery type;

mapping each virtual link of one or more virtual links on a virtual network to both the working physical resource and the protection physical resource before a fault is detected;

determining that a fault occurs on a physical link on the a physical network, wherein the physical link that is faulty corresponding to a first virtual link on the virtual network; and storing information about a protection capability failure that is on the first virtual link, wherein the information about the protection capability failure is used to instruct the first virtual link to start a corresponding protection physical resource during establishment of a service.

18. The method according to claim 17, wherein the virtual network resource parameter comprises transmission traffic between any two service access nodes.

19. A virtual network protection apparatus, comprising:
a receiver, configured to receive a virtual network topology establishment request message, wherein the virtual network topology establishment request message carries a virtual network resource parameter and/or a virtual network protection and recovery type;
a processor, configured to:
reserve a working physical resource and a protection physical resource in an idle physical resource of a physical network according to the virtual network resource parameter and/or the virtual network protection and recovery type;
map each virtual link of one or more virtual links on a virtual network to both the working physical resource and the protection physical resource before a fault is detected;
determine that a fault occurs on a physical link on the a physical network, wherein the physical link that is faulty corresponds to a first virtual link on the virtual network; and
store information about a protection capability failure that is on the first virtual link, wherein the information about the protection capability failure is used to instruct the first virtual link to start a corresponding protection physical resource during establishment of a service.

20. The apparatus according to claim 19, wherein the virtual network resource parameter comprises transmission traffic between any two service access nodes.

* * * * *